June 24, 1930.  G. H. GARRISON  1,767,281
BURNING KILN
Filed April 15, 1925   2 Sheets-Sheet 2
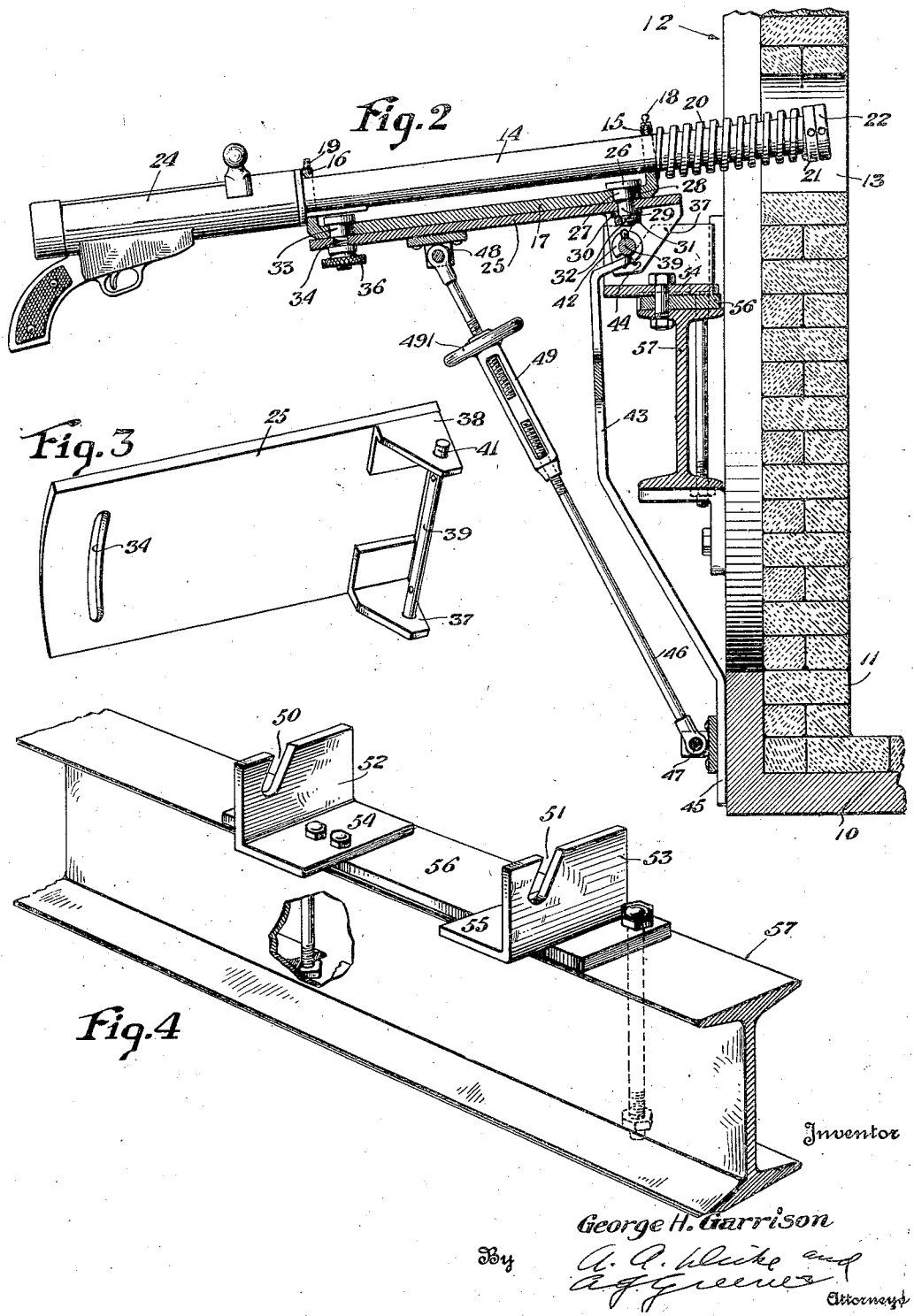
Inventor
George H. Garrison
By
Attorneys Patented June 24, 1930

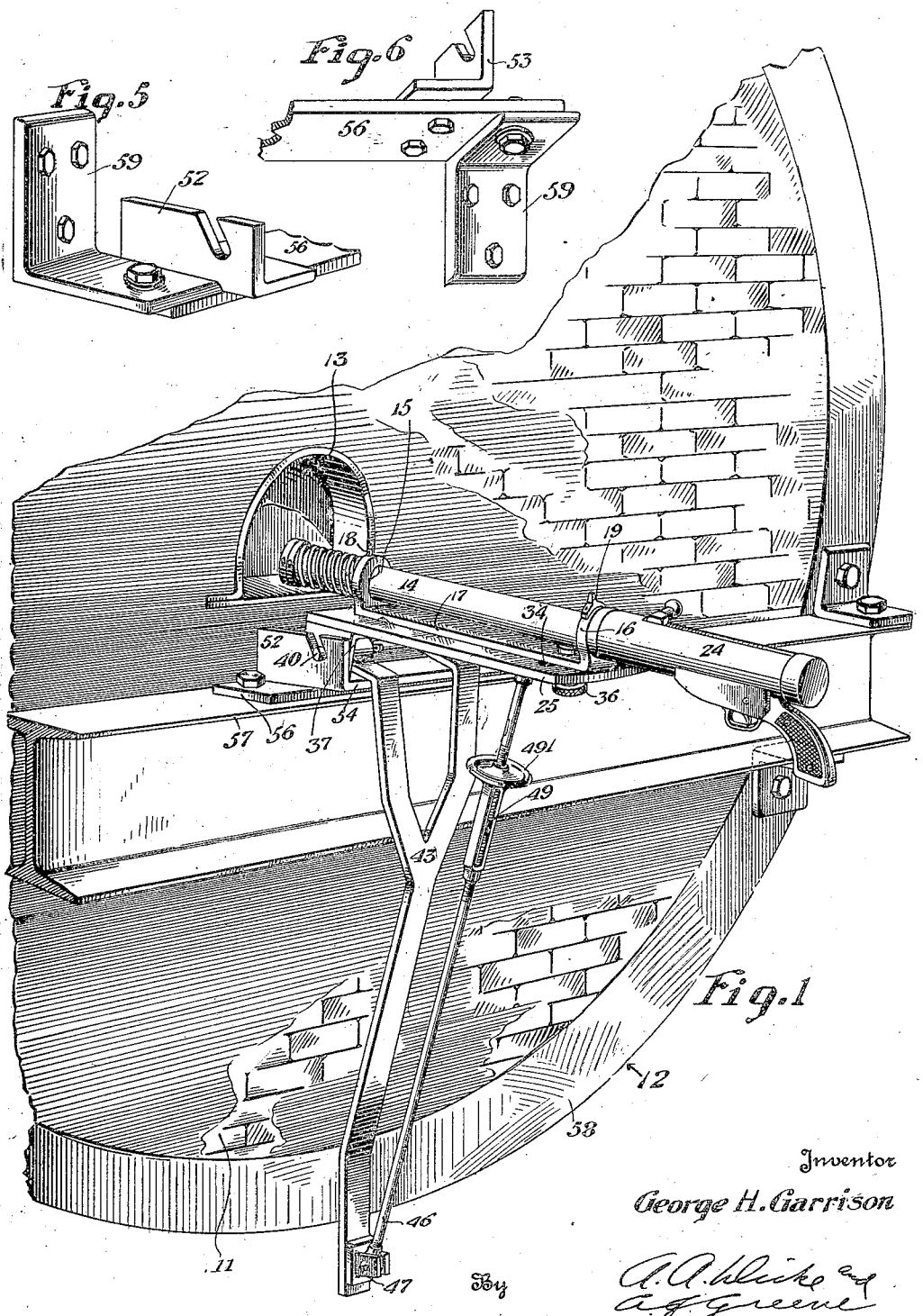

1,767,281

UNITED STATES PATENT OFFICE

GEORGE HENRY GARRISON, OF BRIDGEPORT, CONNECTICUT, ASSIGNOR TO REMINGTON ARMS COMPANY, INC., A CORPORATION OF DELAWARE

BURNING KILN

Application filed April 15, 1925. Serial No. 23,396.

This invention relates to kilns for the manufacture of cement or lime or other materials formed by fusing or burning, and in particular to means for removing clinker rings and other obstructions adhering to the inside of the kiln.

It is well known that in the manufacture of cement and other similar products which are fused or burned in a kiln that the wall of the kiln adjacent to the burning end is apt to become coated with the fused clinker. The tendency to coating as well as the character of the coating formed vary with the cement forming materials found in different localities, as well as with the process of manufacture. Under some conditions the coating may take the shape of a heavy ring, formed at distances varying from 20 to 40 feet, from the burning end of the kiln. If not broken down and removed such a ring continues to increase the thickness and soon becomes a very serious obstruction.

Hitherto, such rings have been removed by various means, such, for example, as a heavy jet of water under high pressure. Usually when such a "water bar" is used a slot or key is cut thru the ring to the wall of the kiln. The removal of a ring by this or any other of the means which have been used hitherto, is a slow and expensive process requiring the stopping and cooling of the kiln, and the loss of time in the operation of the kiln which in the case of a large ring has often amounted to as much as thirty-six hours.

One object of the present invention is to provide a novel and effective means for quickly removing clinker rings without the necessity of cooling the kiln, and with the loss of but very little time.

A further object of the invention is to provide a novel method for removing clinker rings, this method including the use of a specially designed firearm.

A further object of the invention is to provide novel means for removing clinker rings, said means including a firearm adapted to be mounted upon the end of a burning kiln.

A further object of the invention is to provide in combination with burning kiln means for mounting a firearm thereon.

With these and other objects in view the invention consists in the novel combinations and arrangements of parts which are illustrated in the drawings and will be hereinafter more fully described.

In the drawings:—

Fig. 1 is a perspective of the end of a cement kiln showing the devices of this invention attached thereto.

Fig. 2 is as a side elevation, partly in section of the end of cement kiln having the present invention applied thereto.

Fig. 3 is an inverted perspective view of the bed plate to which the clinker removing gun is attached.

Fig. 4 is a fragmentary perspective of the part of the mounting mechanism which is attached to the kiln.

Fig. 5 is a fragmentary perspective of a slightly modified form of mounting means for attachment of the kiln.

Fig. 6 is a fragmentary perspective of another modification of the mounting means.

The usual cement kiln comprises a large cylindrical chamber, ordinarily made of heavy boiler plate 10 lined with fire brick or other heat resisting material 11, and arranged for rotation about its longitudinal axis, which axis is inclined slightly to the horizontal. The cement forming materials are introduced into the upper end of the kiln and in the rotation of the kiln move toward the lower or "burning" end, at which heat is supplied by the combustion of powdered coal or oil, introduced in an air blast. The burning end of the kiln may be closed by a shield 12 constructed of a refractory material, such as fire brick. In some instances the outside of the shield is covered with boiler plate. An opening 13 arranged at a convenient height in the shield permits observation of the operation of the kiln.

"Clinker rings" are most apt to form at distances varying from twenty to forty feet from the burning end of the kiln. For the removal of these obstructions the present invention contemplates the provision of a specially designed firearm, and the mounting of such a firearm on the shield in position to shoot thru the sight opening 13. The mounting means is, of course, arranged to permit the necessary recoil of the gun, and to provide for lateral and vertical shift of the point of aim. Provision is also made for quickly placing the gun in position, and removing it when the obstruction has been cleared away. To this end certain parts are permanently attached to the shield, and the gun itself is provided with mounting devices adapted to be quickly and easily fitted to the supports on the shield.

The construction of the gun proper may be greatly varied. Most excellent results have been secured with a gun of the general type of a shoulder rifle, but of somewhat larger caliber, and designed to fire a projectile at a lower velocity than a modern rifle. The projectile for example may be about one inch in diameter and weigh about three ounces and be fired with a velocity of about nine hundred feet per second. These dimensions, however, are illustrative rather than restrictive. A firearm provided with a "bolt action" breech mechanism has been shown. Surrounding the barrel 14 at spaced positions are the upstanding ends 15 and 16 of a yoke 17, these ends being surmounted by sights 18 and 19. A recoil spring 20 is interposed between the forward end 15 of the yoke and a collar 21, which is held by a nut 22 threaded to the muzzle of the barrel. The rear end 16 of the yoke normally rests against a collar 23, which engages the forward end of the receiver 24. When fired the gun recoils through the yoke end openings and is restored by the recoil spring 20.

The yoke 16 is supported from and pivoted to a table 25. The pivot stud comprises a flat head 26, and a shank 27 provided with a key 28 these parts being adapted to fit in an opening provided therefor in the yoke. Below the shank 27 the stud comprises a section 29 of reduced diameter, which passes through the table 25 and a washer 30. The end section of the stud is of reduced diameter, whereby the nut 31 abuts a shoulder 32 to prevent drawing yoke 16 and plate 23 too tightly together. A second flat headed stud 33 passes through an opening near the rear end of the yoke 17 and through an arcuate slot 34 in the table 25. A nut provided with an enlarged knurled head or hand wheel 36 provides a means for securing the yoke and the gun in any desired position relative to the table 25.

A pair of angles 37 and 38 are secured at the forward corners of the table 25, and a pivot and supporting rod 39 extends between and projects a slight distance beyond the angles to form trunnions 40 and 41.

The ends 42 of a bifurcated strut 43 are pivoted to the rod 39 adjacent to the inner faces of angles 37 and 38, and cotter pins 44 may be provided to prevent displacement thereof. The strut is shaped to clear the supports mounted on the shield which will presently be described, and to provide a surface 45 adapted to contact with the lower part of the face of the shield. A tie bar 46 is pivotally connected to the strut 43 at 47, and to the table 25 at 48. The tie bar is in two sections provided at their adjacent ends with right and left hand threads, and connected by a turn buckle 49 comprising a hand wheel 491 to facilitate its manipulation. By adjustment of the turn buckle 49 the rear end of the table is raised or lowered, the table pivoting about rod 39, and the pointing of the gun is shifted accordingly.

The trunnions 40 and 41 are received in inclined bearing slots 50 and 51 in a pair of supports 52 and 53 which are mounted on the shield. In the form of mounting which has been illustrated the supports are of angular shape comprising horizontally extending flanges 54 and 55 adapted to be bolted or otherwise secured to a stiffening plate 56 which is secured to members mounted directly on the shield. In a preferred embodiment of the invention the stiffener plate is bolted to an I beam 57 which extends across the shield, and is secured near its end to the shield frame 58. If the shield is faced with metal the I beam may be replaced by angles (Figs. 5 and 6) secured to the stiffener plate 56, and having webs 59 which lie against the face of the shield, which webs may extend upward from the plate, as illustrated in Fig. 5 or downwardly from the plate as illustrated in Fig. 6.

It will be noted that the gun, the table and parts attached thereto may be removed merely by lifting the trunnions 40 and 41 out of the bearing slots 50 and 51. In its normal operation the kiln is thus not encumbered by the gun, and the gun may be stored in a suitable plate. When the gun is needed all that is necessary is to place the trunnions in the bearing slots, and permit end 43 of the strut 43 to drop against the face of the shield. The gun is then ready to fire, being aimed at the same point as before its removal. The point of aim being shifted vertically by manipulation of the turn buckle hand wheel 491, and laterally by swinging the gun and its yoke about the pivot 27, the hand screw 36 being loosened to permit this movement, and tightened again with the gun in the desired positions.

The devices shown and described are to be considered as illustrative rather than restrictive, and it is to be understood that various changes in construction may be made without departing from the invention as defined in the following claims.

I claim:

1. Means for mounting a firearm on a burning kiln comprising a yoke having ends which encircle the barrel of said firearm, and a recoil spring abutting one of said ends.

2. Means for mounting a firearm on a burning kiln comprising a table attached to the firearm and provided with trunnions, a supporting strut and a tie rod extending downward from said table and joined at their lower ends to form a rigid frame, the lower end of said frame being adapted to bear against the kiln, thereby supporting the firearm in place.

3. Means for mounting a firearm on a burning kiln, comprising a table attached to the firearm and provided with trunnions and a supporting frame adapted to bear against a part of the kiln, and devices mounted on said kiln comprising slotted bearings adapted to receive said trunnions.

4. Means for mounting a firearm on a burning kiln comprising a supporting member secured to the kiln, a stiffener plate secured to said supporting member, a pair of angles secured to said stiffener plate, inclined bearing slots in said angles and devices associated with a firearm comprising trunnions adapted to be received in said inclined bearing slots.

5. In apparatus of the character described, in combination, a firearm, a table, a yoke pivoted to said table and having ends encircling the barrel of said firearm, an abutment near the end of the barrel of the firearm, a recoil spring interposed between one end of said yoke and said abutment, and means for retaining said firearm in different positions relative to said table.

6. In apparatus of the character described, in combination, a firearm, a supporting table, means for pivotally securing said firearm to said table, means for holding said firearm in any desired position with respect to said table, a burning kiln, means for pivotally supporting said table on said burning kiln, and means for retaining said table at any desired position with respect to said kiln.

7. Means for mounting a firearm on a burning kiln comprising a table, a firearm pivoted to said table, an arcuate slot in said table, means associated with said firearm extending through said slot, devices for securing said means in any desired position in said slot, and means for pivotally supporting said table on a burning kiln.

GEORGE HENRY GARRISON.